United States Patent
Thang et al.

(10) Patent No.: US 9,338,211 B2
(45) Date of Patent: *May 10, 2016

(54) APPARATUS AND METHOD FOR PROVIDING STREAMING CONTENT

(71) Applicants: Electronics and Telecommunications Research Institute, Daejeon (KR); INDUSTRY-UNIVERSITY COOPERATION FOUNDATION KOREA AEROSPACE UNIVERSITY, Goyang-si Gyeonggi-do (KR)

(72) Inventors: Truong Cong Thang, Daejeon (KR); Jin Young Lee, Daejeon (KR); Seong Jun Bae, Daejeon (KR); Jung Won Kang, Daejeon (KR); Soon Heung Jung, Daejeon (KR); Sang Taick Park, Daejeon (KR); Won Ryu, Daejeon (KR); Jae Gon Kim, Goyang-si (KR)

(73) Assignees: INDUSTRY-UNIVERSITY COOPERATION FOUNDATION KOREA AEROSPACE UNIVERSITY, Goyang-si, Gyeonggi-do (KR); Electronics and Telecommunications Research Institute, Daejeon (KR)

( * ) Notice: Subject to any disclaimer, the term of this patent is extended or adjusted under 35 U.S.C. 154(b) by 358 days.

This patent is subject to a terminal disclaimer.

(21) Appl. No.: 14/146,434

(22) Filed: Jan. 2, 2014

(65) Prior Publication Data

US 2014/0122738 A1 May 1, 2014

Related U.S. Application Data

(63) Continuation of application No. 13/820,955, filed on Mar. 5, 2013, now Pat. No. 8,645,562.

(30) Foreign Application Priority Data

Sep. 6, 2011 (KR) .......................... 10-2011-0089923

(51) Int. Cl.
G06F 15/16 (2006.01)
H04L 29/06 (2006.01)
(Continued)

(52) U.S. Cl.
CPC ........ *H04L 65/608* (2013.01); *H04L 29/06027* (2013.01); *H04L 65/4084* (2013.01);
(Continued)

(58) Field of Classification Search
USPC .................. 709/203, 223–229, 231–232, 250
See application file for complete search history.

(56) References Cited

U.S. PATENT DOCUMENTS

2010/0235472 A1  9/2010  Sood et al.
2012/0233345 A1* 9/2012  Hannuksela ..... H04N 21/26258
                                                        709/231

(Continued)

FOREIGN PATENT DOCUMENTS

JP         2005071318 A      3/2005

OTHER PUBLICATIONS

Ying Chen et al., "Response to the CFP on HTTP Streaming: Adaptive Video Streaming based on AVC," International Organisation for Standardisation, Jul. 2010, pp. 1-20, ISO/IEC JTC1/SC29/WG11, MPEG2010/MI7909, Qualcomm Incorporated, Geneva, Switzerland.

(Continued)

*Primary Examiner* — Zarni Maung
(74) *Attorney, Agent, or Firm* — William Park & Associates Ltd.

(57) ABSTRACT

A method and apparatus for an adaptive Hypertext Transfer Protocol (HTTP) streaming service using metadata of content are provided. The metadata may include one or more BaseURL elements. Uniform Resource Locators (URLs) of segments forming media may be generated based on the BaseURL elements. Additionally, a URL of a segment may be generated by mapping a BaseURL element among the BaseURL elements to a sourceURL attribute of the segment. Segments indicated by generated URLs may be identical to each other.

4 Claims, 6 Drawing Sheets

(51) Int. Cl.
  *H04N 21/61* (2011.01)
  *H04N 21/845* (2011.01)
  *H04N 21/84* (2011.01)
  *H04N 21/235* (2011.01)
  *G06F 12/00* (2006.01)
  *H04N 21/238* (2011.01)
  *H04N 21/24* (2011.01)
  *H04N 21/44* (2011.01)

(52) U.S. Cl.
  CPC ............. *H04L65/60* (2013.01); *H04L 65/607* (2013.01); *H04N 21/2353* (2013.01); *H04N 21/6125* (2013.01); *H04N 21/84* (2013.01); *H04N 21/845* (2013.01); *H04N 21/8456* (2013.01); *H04N 21/23805* (2013.01); *H04N 21/2401* (2013.01); *H04N 21/44004* (2013.01)

(56) References Cited

U.S. PATENT DOCUMENTS

| | | | | |
|---|---|---|---|---|
| 2013/0117413 | A1* | 5/2013 | Kaneko | H04N 21/438 709/217 |
| 2013/0182643 | A1* | 7/2013 | Pazos | H04L 65/4076 370/328 |
| 2013/0254631 | A1* | 9/2013 | Luby | H03M 13/356 714/776 |
| 2015/0172348 | A1* | 6/2015 | Lohmar | H04L 65/607 709/219 |
| 2015/0280965 | A1* | 10/2015 | Kervadec | H04L 65/4084 709/203 |

OTHER PUBLICATIONS

"Universal Mobile Telecommunications System," ETSI TS 126 234, Jun. 2010, pp. 1-184, V9.3.0, Sophia Antipolis Cedex, France.

* cited by examiner

APPARATUS AND METHOD FOR PROVIDING STREAMING CONTENT

TECHNICAL FIELD

The present invention relates to a technology for providing streaming content, and more particularly, to an apparatus and method for providing media content using adaptive streaming.

BACKGROUND ART

Streaming is one of schemes for transmitting and playing back multimedia content such as sounds, moving images, and the like. A client may play back content while receiving the content through the streaming.

An adaptive streaming service refers to providing a streaming service employing a communication scheme with a request of a client and a response of a server in response to the request.

The client may request a media sequence suitable for an environment of the client (for example, a transmission channel of the client), using the adaptive streaming service. The server may provide a media sequence matched to the request of the client among media sequences with various qualities that are included in the server.

The adaptive streaming service may be provided based on various protocols.

A Hypertext Transfer Protocol (HTTP) adaptive streaming service refers to an adaptive streaming service provided based on an HTTP protocol. A client of the HTTP adaptive streaming service may receive content from a server using the HTTP protocol, and may transmit a request associated with a streaming service to the server.

DISCLOSURE OF INVENTION

Technical Goals

An aspect of the present invention provides an apparatus and method that may interpret a Uniform Resource Locator (URL) of a segment using one or more BaseURL elements during playback of content.

Another aspect of the present invention provides an apparatus and method that may generate a URL of a segment by mapping a BaseURL element among one or more BaseURL elements to a sourceURL attribute of the segment.

Technical Solutions

According to an aspect of the present invention, there is provided a method for providing media, the method including: receiving metadata of media, the metadata including one or more BaseURL elements; sending a request for a segment of the media using a Uniform Resource Locator (URL) of the segment, the URL being resolved with respect to a BaseURL element; receiving the segment; and decoding and rendering data of the media that is included in the segment.

The request may be sent using an HTTP GET method.

The metadata may include a range attribute.

The request may include a request for bytes of a resource indicated by the URL that are designated by the range attribute.

The URL may be an absolute URL or a relative URL.

Identical segments may be accessible at multiple locations indicated by URLs resolved with respect to the respective BaseURL elements.

A first BaseURL element among the BaseURL elements may be used as a basic Universal Resource Indicator (URL), and BaseURL elements other than the first BaseURL element may be used as alternative BaseURL elements.

The metadata may selectively include a sourceURL attribute of the segment. When the metadata selectively includes the sourceURL attribute of the segment, a BaseURL element among the BaseURL elements may be mapped to the sourceURL attribute, so that the URL may be generated.

The metadata may be a Media Presentation Description (MPD) of the media.

The media may include a sequence of one or more periods.

A BaseURL element may include one or more MPD level BaseURL elements of the MPD, and one or more period level BaseURL elements of the periods.

A URL of a segment included in each of the periods may be resolved with respect to a period level BaseURL element.

The period level BaseURL elements may be resolved with respect to the MPD level BaseURL elements.

Each of the periods may include one or more groups.

The BaseURL element may further include one or more group level BaseURL elements of the groups.

A URL of a segment included in each of the groups may be resolved with respect to a group level BaseURL element.

The group level BaseURL elements may be resolved with respect to the period level BaseURL elements.

Each of the groups may include one or more representations.

Each of the representations may be a structured collection of one or more components of the media within a period.

The BaseURL element may further include one or more representation level BaseURL elements of the representations A URL of a segment included in each of the representations may be resolved with respect to a representation level BaseURL element.

The representation level BaseURL elements may be resolved with respect to the group level BaseURL elements or the period level BaseURL elements.

According to another aspect of the present invention, there is provided a terminal, including: an access engine to receive metadata of media, to send a request for a segment of the media using a Uniform Resource Locator (URL) of the segment, to receive the segment, and to decode data of the media that is included in the segment, the metadata including one or more BaseURL elements, and the URL being resolved with respect to a BaseURL element; and a media engine to receive the data of the media from the access engine, and to output the media.

Effect of the Invention

According to embodiments of the present invention, it is possible to interpret a Uniform Resource Locator (URL) of a segment using one or more BaseURL elements during playback of content.

Additionally, according to embodiments of the present invention, it is possible to generate a URL of a segment by mapping a BaseURL element among one or more BaseURL elements to a sourceURL attribute of the segment.

BEST MODE FOR CARRYING OUT THE INVENTION

Figure 1:
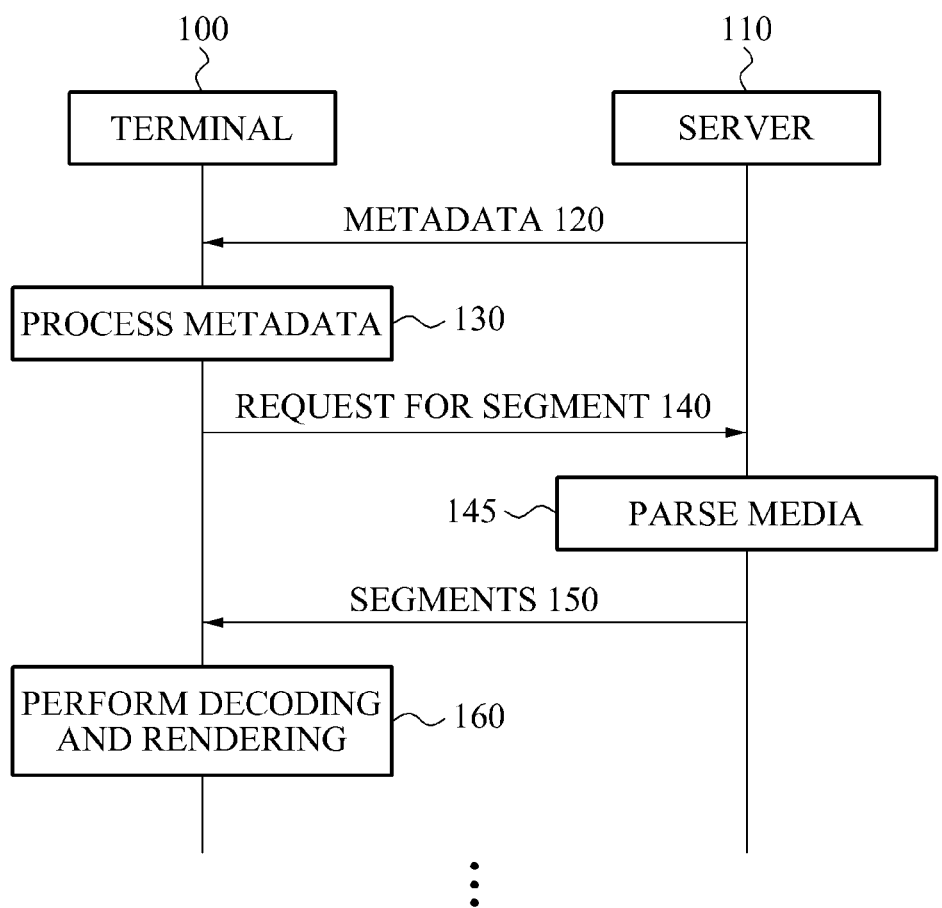
FIG. 1 is a signal flowchart illustrating a content processing method according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A Dynamic Adaptive Streaming over HTTP (DASH) may specify formats that enable 1) delivery of media content from an HTTP server to an HTTP client, and enable 2) caching of content by standard HTTP cashes.

A media component may be an encoded version of individual media types, such as audios, videos, or timed texts with specific attributes, for example bandwidths, languages, or resolutions.

Media content may be a set of media components having a common timeline, for example audios, videos, or timed texts. Additionally, media components may have relationships on how the media components may be presented (for example, individually, jointly, or mutually exclusive) as programs or movies.

Media content and content may be used as interchangeable terms.

A media presentation (or media) may be a structured collection of data used to establish bounded or unbounded presentation of media content including components of continuous media.

In other words, the media presentation may be a structured collection of data that is accessible to a DASH client in order to provide a streaming service to a user.

A Media Presentation Description (MPD) may be a formalized description for a media presentation.

The media presentation may be described by an MPD including possible updates of the MPD.

Content may be content on demand, or live content.

The content may be divided into one or more intervals. In other words, the content may include one or more intervals.

Intervals may be interchangeable with periods. The term period may be used as a term of 3$^{rd}$ Generation Partnership Project (3GPP) adaptive HTTP streaming.

A period may be an interval of a media presentation. A continuous sequence of all periods may constitute the media presentation.

In other words, the media presentation may include a sequence of one or more periods.

One or more intervals may be a basic unit. One or more intervals may be described by signaling metadata. In other words, metadata may describe each of the one or more intervals.

The metadata may be an MPD.

The MPD may define a format to announce resource identifiers for segments. The MPD may provide a context for identified resources within the media presentation. The resource identifiers may be HTTP-Uniform Resource Locators (URLs). URLs may be restricted by a byte range attribute.

Each interval may be divided into fragments.

Fragments may be interchangeable with segments. The term segment may be used as a term of 3GPP adaptive HTTP streaming.

A segment may refer to an entity body of a response to an HTTP/1.1 GET request for an HTTP-URL, for example as defined in RFC 2616, (or a GET request for a part indicated by a byte range).

A terminal may play back media content using received bytes (namely, a segment).

A sub-segment may refer to a smallest unit within segments that may be indexed by a segment index at the segment level.

Two or more sets of fragments corresponding to a single interval may exist. Each of the sets may be called an alternative.

An alternative may be interchangeable with a representation (or an expression).

Each period may include one or more groups.

Each group may include one or more representations of the same media content.

A representation may refer to a structured collection of one or more media components within a single period. A representation may be one of alternative choices of the media content or a subset of the media content typically differing by the encoding choice, for example by a bitrate, a resolution, a language, a codec, and the like.

An MPD (or an MPD element) may provide descriptive information that enables a client to select one or more representations.

A Random Access Point (RAP) may be a specific location in a media segment. The RAP may be identified as a location in which playback may be started continuously to from a location of the RAP using only information included in a media segment.

Each representation may be formed of one or more segments. In other words, a representation may include one or more segments.

An MPD may be a document including metadata required to a DASH client to form appropriate HTTP-URLs in order to 1) access segments and to 2) provide a user with a streaming service. The HTTP-URLs may be absolute or relative.

The MPD may be an Extensible Markup Language (XML)-document.

The MPD may include an MPD element. The MPD may include only a single MPD element.

FIG. 1 is a signal flowchart illustrating a content processing method according to an embodiment of the present invention.

A terminal 100 may be a DASH client.

The DASH client may be compatible with a client specified in RFC 2616.

The DASH client may typically use an HTTP GET method or an HTTP partial GET method, as specified in RFC 2616, to access segments or parts of segments.

A server 110 may perform hosting on DASH segments. The server 110 may be compatible with a server specified in RFC 2616.

In operation 120, the terminal 100 may receive metadata of media (or content) from the server 110. In other words, the server 110 may transmit the metadata of the media to the terminal 100.

The metadata may include BaseURL elements. One or more BaseURL elements may be provided.

In operation 130, the terminal 100 may process the received metadata. In operation 130, the terminal 100 may extract information provided by the metadata, or information included in the metadata.

In operations 140 through 150, the terminal 100 may access a segment of the media based on the information provided by the metadata.

Each period may include one or more groups, and each of the groups may include one or more representations of the media. Each of the representations may include one or more segments.

The metadata may describe a group element describing each of the groups.

In operation 140, the terminal 100 may send a request for a segment of the media to the server 110 using a URL of the segment. The URL may be resolved with respect to one of the above-described BaseURL elements. For example, the URL of the segment may be generated based on a BaseURL element.

The terminal 100 may request the server 110 to transmit a segment suitable for a specific interval based on the processed metadata. In other words, the requested segment may be selected based on the metadata. The request may be sent using the HTTP GET method.

The metadata may include a range attribute. The request may include a request for bytes of a resource indicated by a URL that are designated by the range attribute.

The URL of the segment may be an absolute URL or a relative URL.

Identical segments may be accessible at multiple locations indicated by URLs resolved with respect to the respective BaseURL elements. In other words, identical segments may be selectively accessible by the URLs provided by the BaseURL elements.

Additionally, a first BaseURL element among the BaseURL elements may be used as a basic Universal Resource Indicator (URL), and BaseURL elements other than the first BaseURL element may be used as alternative BaseURL elements.

The metadata may selectively include a sourceURL attribute of the segment. When the metadata selectively includes the sourceURL attribute of the segment, a BaseURL element among the BaseURL elements may be mapped to the sourceURL attribute, so that the URL of the segment may be generated.

In operation 145, in several cases, the server 110 may need to parse content (for example, a Moving Picture Experts Group (MPEG) layer 4 (MP4) file for Scalable Video Coding (SVC)), and may extract a data part suitable for the requested segment.

In operation 150, the server 110 may transmit, to the terminal 100, segments suitable for each request from the terminal 100. The terminal 100 may receive the segments from the server.

In operation 160, the terminal 100 may perform decoding and rendering on data of the media included in the segment, to play back the media.

The terminal 100 may play back the media using the received segments by repeating operations 120 through 160.

Here, a BaseURL element may include an MPD level BaseURL element of an MPD, and a period level BaseURL element of each period. The period level BaseURL element may refer to a BaseURL element applied to a period to which the period level BaseURL element belongs. In other words, a URL of a segment included in each period may be resolved with respect to the period level BaseURL element.

One or more MPD level BaseURL elements may be provided, and one or more period level BaseURL elements may be provided.

Additionally, the BaseURL element may further include a group level BaseURL element of a group. A URL of a segment included in each group may be resolved with respect to the group level BaseURL element. One or more group level BaseURL elements may be provided.

The BaseURL element may further include a representation level BaseURL element of a representation. A URL of a segment included in each representation may be resolved with respect to the representation level BaseURL element.

A BaseURL element of a specific level may be resolved with respect to a BaseURL element of a higher level. For example, a period level BaseURL element may be resolved with respect to an MPD level BaseURL element. A group level BaseURL element may be resolved with respect to a period level BaseURL element. A representation level BaseURL element may be resolved with respect to a group level BaseURL element or a period level BaseURL element.

Figure 2:
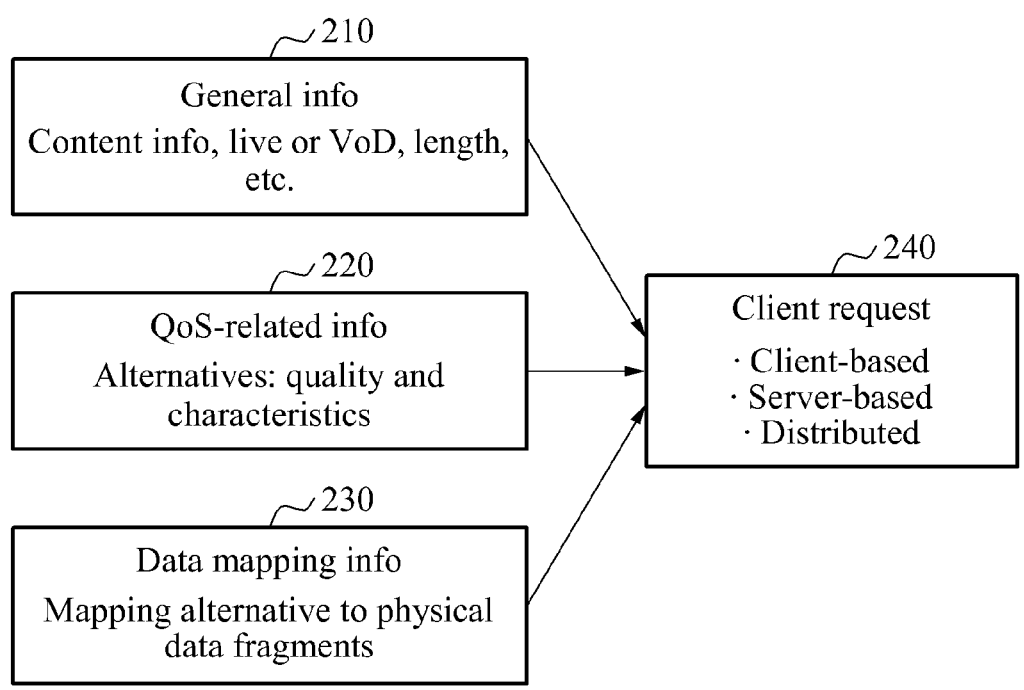
FIG. 2 is a diagram illustrating categories of signaling information according to an embodiment of the present invention.

FIG. 2 is a diagram illustrating categories of signaling information according to an embodiment of the present invention.

The signaling information (namely, metadata) may be divided into the following categories 1) through 4):

1) General information 210: includes common description of content, and general description of each interval, such as a duration, and a start time.

2) Quality of Service (QoS) information 220: describes characteristics of each alternative, such as a bitrate, a resolution, and a quality. In other words, the QoS information describes characteristics of each of alternatives of content.

An alternative may be physical (namely, created in advance), or may be virtual (namely, to be created on the fly). Based on information of alternatives, the client may select a fragment of an appropriate alternative. Accordingly, adaptivity to contexts of terminals and networks may be supported.

3) Mapping information 230: describes locations to retrieve content. Depending on specific cases, different alternatives may have the same or different locations.

4) Client request 240: this type of signaling information may conform to a format of HTTP 1.1 request message. As shown in FIG. 1, parameters requested by the client may be derived from the information of categories 1) through 3).

Figure 3:
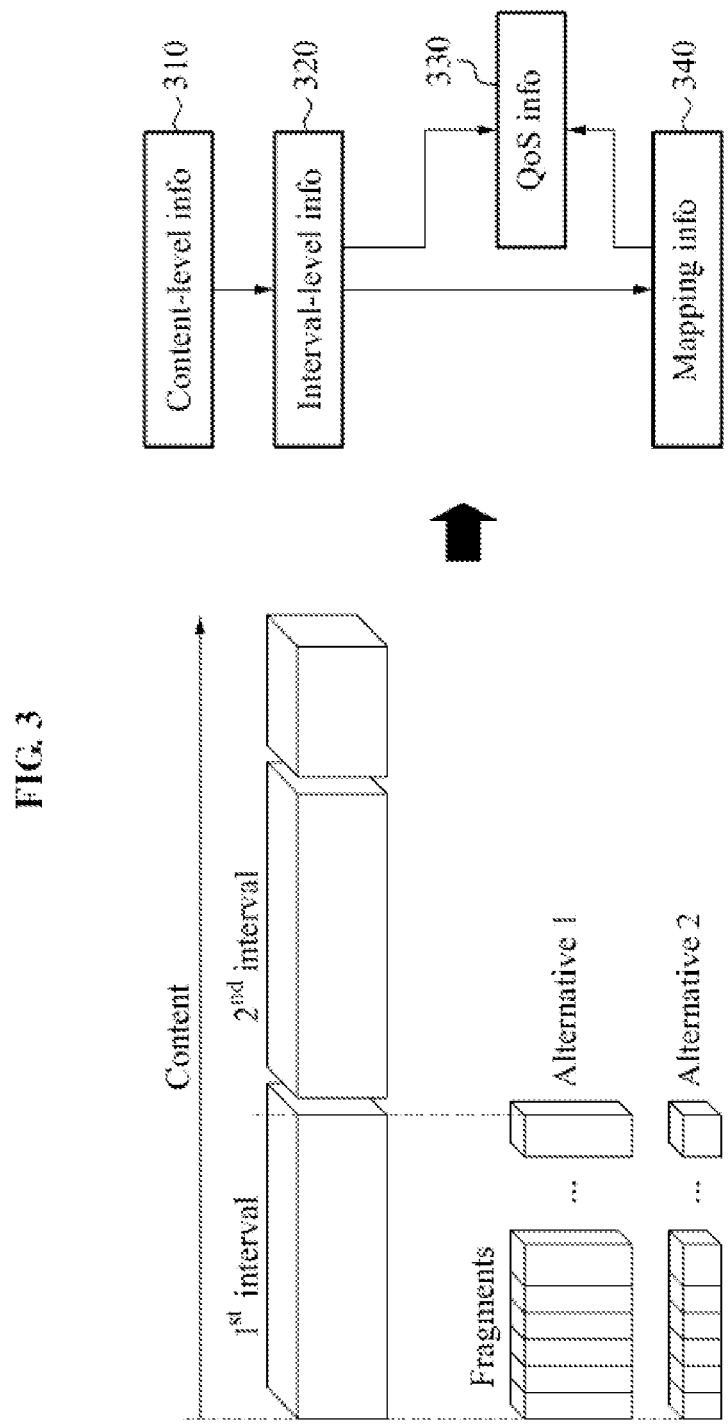
FIG. 3 is a diagram illustrating a hierarchy of content division and levels of signaling information according to an embodiment of the present invention.

FIG. 3 is a diagram illustrating a hierarchy of content division and levels of signaling information according to an embodiment of the present invention.

Signaling of metadata according to an embodiment of the present invention may be physically separated into content-level information 310, interval-level information 320, QoS information 330, and mapping information 340. Linking of related parts of the content-level information 310, the interval-level information 320, the QoS information 330, and the mapping information 340 may be performed by reference.

These parts of signaling information may be combined in different ways to support the flexibility.

For example, when only the content-level information 310 and interval-level information 320 are sent to a client, all computations for deciding alternatives and resolving locations may be performed by a server. Accordingly, when only the content-level information 310 and interval-level information 320 are sent to the client, a processing model may be "server-based."

When the content-level information 310, the interval-level information 320, and the QoS information 330 are sent to the client, all computations for deciding alternatives and resolving locations may be distributed and performed by the client and the server. Accordingly, when the content-level information 310, the interval-level information 320, and the QoS information 330 are sent to the client, the model may be "distributed."

When all the signaling information (namely, the content-level information 310, the interval-level information 320, the QoS information 330, and the mapping information 340) is sent to the client, the model may be client-based, because most (or all) processing (namely, computations for deciding alternatives and resolving locations) is performed by the client.

The separation of metadata parts may enable efficiency in storage and delivery. For example, during a session, metadata of the content-level information 310 may be sent once, and only the interval-level information 320 may be periodically updated. Similarly, a single file containing the QoSInfo 330 may be used for different intervals and different contents.

There are different ways to represent a set of metadata, for example XML, pseudo-code, a Session Description Protocol (SDP), and the like.

In embodiments of the present invention, both XML and pseudo-code may be used to represent signaling syntax. XML syntax may be used for clients that support an XLM profile based on an MPEG-21 and similar schema. On the other hand, pseudo-code syntax may be based on a "language" of an International Organization for Standardization (ISO) base media file format and the like, and may be used in non-XML clients. In particular, a profile of the pseudo-code syntax may employ a parsing module similar to a parsing module of file-format parsing. To design the syntax for the above purpose, a table of common elements may be defined and elements in each format may be represented, in the following embodiments.

The proposed syntax may be represented by any other languages.

Hereinafter, tables of general syntax elements will be described.

In the column of occurrence, "0 . . . N" may mean that the number of instances of an occurrence element may be from 0 to "unbounded." The minimum occurrence of 0 may mean that an element may be optional (namely, not present). A minimum occurrence equal to or greater than 1 may mean that an element is mandatory in the syntax.

Occurrence may be interchangeable with cardinality.

In a row of type, A indicates an attribute, and E indicates an element. In a row of optionality, M indicates mandatory, and O indicates optional. For attributes, M indicates mandatory, O indicates optional, OD indicates optional with default value, and CM indicates conditionally mandatory. For elements, elements may be represented as <minOccurs> . . . <maxOccurs>. Here, N may be unbounded.

The above meaning may equally be applied to other tables in the present specification.

Additionally, QoSInfo may be also called AdaptationInfo to make QoSInfo more specific. Moreover, a few elements may be revised to increase flexibility of the syntax.

The following Table 1 describes general information.

TABLE 1

| | | | Occurrence | Semantics | XML syntax (based on MPEG-21) | Pseudo-code (File format box) |
|---|---|---|---|---|---|---|
| HttpStr | | | 1 | Describes the top-level element of signaling metadata for HTTP streaming | HttpStreamingType | 'htps' box |
| | GeneralInfo | | 0 . . . N | Contains the general information of the described content | GeneralInfoType | 'geni' box |
| | | TimeScale | 0 . . . 1 | Describes the number of time units in 1 second. This value is used with time-related elements, when a time unit is not specified. | integer | unsigned int(32) |
| | | LiveStartTime | 0 . . . 1 | If LiveStartTime element is not present, the content is of VoD type. The presence of LiveStartTime element indicates a live content that is to be displayed at a time value of LiveStartTime. If LiveStartTime has a time value of 0, the display time is unknown. | dateTime | unsigned int(64) |
| | | Duration | 0 . . . 1 | If present, indicates duration of the content. Otherwise, the duration is unknown. | integer | unsigned int(32) |
| | | DefaultIntDuration | 0 . . . 1 | If present, indicates a default duration of each interval of the content. | integer | unsigned int(32) |
| | | MinUpdateTime | 0 . . . 1 | If present, indicates the minimum waiting time before requesting the main description file again. | integer | unsigned int(32) |
| | | ConsistentQoSInfo | 0 . . . 1 | If true, indicates that QoS information is the same as the whole content duration. | boolean | flag of the box |

TABLE 1-continued

| | | Occurrence | Semantics | XML syntax (based on MPEG-21) | Pseudo-code (File format box) |
|---|---|---|---|---|---|
| | DefaultContentLoc | 0 ... 1 | Provides a default location for the content. | anyURI | string of URL |
| IntervalsRef | | 0 ... N | Provides reference to description containing one or more instances of Interval element. One or more instances of Interval element represent a sequence of consecutive interval(s). | Intervals RefType | 'iref' box |
| Interval | | 0 ... N | Provides information of an interval of content. The information of the interval may be either included as an instance of Interval element or referenced by IntervalsRef element. | IntervalType | 'intv' box |
| | IntervalInfo | 0 ... 1 | Provides general information of an interval. | IntervalInfoType | 'inti' box |
| | QoSInfoRef | 0 ... 1 | Provides reference to description represented by QoSInfo element. If QosInfoRef element is present, QoSInfo element may not be present at the same level. | dia:ReferenceType | 'qref' box |
| | QoSInfo | 0 ... 1 | Provides information about alternatives of content, such as resource characteristics and quality/utility. If QoSInfo element is present, QoSInfoRef element may not be present. | QoSInfoType | 'QoSi' box |
| | MappingInfoRef | 0 ... 1 | Provides reference to description represented by MappingInfo element. If MappingInfoRef element is present, MappingInfo element may not be present at the same level. | dia:ReferenceType | 'mref' box |
| | MappingInfo | 0 ... 1 | Provides information about locations of content alternatives. If the information is not provided, DefaultContentIntLoc element (if not, DefaultContentLoc) can be used to retrieve content. If MappingInfo element is present, MappingInfoRef element may not be present. | MappingInfoType | 'mapi' box |
| | NextIntervalsRef | 0 ... 1 | Provides reference to information of next interval(s). The information of next interval(s) is description containing one or more instances of Interval element. The information of next interval(s) is description represented by Interval element. Using NextIntervalsRef element, the client does not need to reload the main description represented by HttpStr element. Within the current time window, only the final interval may contain NextIntervalsRef element. | Intervals RefType, may be extended from dia:ReferenceType | 'nref' box |
| | PreviousIntervalsRef | 0 ... 1 | Provides reference to information of previous interval(s). The information of next interval(s) is description containing one or more instances of Interval element. Using PreviousIntervalsRef element, the client does not need to reload the main description represented by HttpStr element. Within the current time window, only the first interval may contain NextIntervalsRef element. | Intervals RefType, may be extended from dia:ReferenceType | 'nref' box |

The following Table 2 describes IntervalsRef, NextIntervalsRef, PreviousIntervalsRef, QoSInfoRef, MappingInfoRef a, and IntervalInfo.

TABLE 2

| | | Occurrence | Semantics | XML syntax (based on MPEG-21) | Pseudo-code (File format box) |
|---|---|---|---|---|---|
| QoSInfoRef, MappingInfoRef | Index | 1 | Indicates the order (starting from 1) of the referenced description or box (Interval, QoSInfo, MappingInfo) in the description file referenced by the next Location element. | not applicable | unsigned int(8) |
| | Location | 1 | Provides reference to description represented by Interval, QoSInfo, or MappingInfo. | uri element in dia:ReferenceType | string (representing url) |
| IntervalInfo | TimeScale | 0 . . . 1 | Describes the number of time units in one second. This value is used with time-related elements, when a time unit is not specified. TimeScale element, if present, overrides the time scale provided by GeneralInfo. | integer | unsigned int(32) |
| | StartTime | 0 . . . 1 | Indicates the start time of the interval. | | |
| | Duration | 0 . . . 1 | Indicates the duration of the interval. | integer | unsigned int(32) |
| | DefaultFrag-Duration | 0 . . . 1 | Indicates the default duration of fragments of the interval (except the last fragment). | integer | unsigned int(32) |
| | DefaultContent-IntLoc | 0 . . . 1 | Provides a default location for the content interval. | anyURI type | string |
| | Last | 0 . . . 1 | If true, indicates the final interval of the content. | boolean | by flag |
| IntervalsRef, PreviousIntervalsRef NextIntervalRef | startTime | | Indicates the start time of the referenced sequence of intervals/periods relative to the start time of the content (LiveStartTime for live content and 0 for on-demand content). | xs:duration | |
| | Available Time | 0 . . . 1 | Indicates the time the description of the next interval is available. The is the relative time from the start time of the content. | integer | unsigned int(32) |
| | Index | 1 | Indicates the order (starting from 1) of the referenced interval description (or box) in the description file referenced by the next Location element. | not applicable | unsigned int(8) |
| | Location | 1 | Provides reference to description file that contains Interval descriptions. | sx:anyURI type or uri element in dia:ReferenceType | string (representing url) |

The following Table 3 describes the QoSInfo element.

TABLE 3

| | | Occurrence | Semantics | XML syntax (based on MPEG-21) | Pseudo-code (File format box) |
|---|---|---|---|---|---|
| QoSInfo | | 1 | Provides information about a list of content alternatives, such as resource characteristics and quality/utility. | QoSInfoType containing a UtilityFunction of dia:AdaptiveQoSType | 'QoSi' box |
| | ClassSchemeRef | 0 . . . 1 | Provides a list of classification schemes. The classification schemes provide semantics for some terms or names. | dia:Description MetadataType | 'csmr' box |
| | scheme | 1 . . . N | Provides reference to a classification scheme. | Attr. alias & href in dia:Description MetadataType | a url string |
| (1) | Resource | 0 . . . N | Each instance of Resource element describes, for a list of alternatives, characteristic values of a certain | Element constraint of dia:UF DataType | 'resi' box |

TABLE 3-continued

|  |  | Occurrence | Semantics | XML syntax (based on MPEG-21) | Pseudo-code (File format box) |
|---|---|---|---|---|---|
|  |  |  | resource type (e.g., bitrate). | in DIA Utility-FunctionType |  |
| (2) | AdaptationOperator | 0 . . . N | Each instance of AdaptationOperator element describes, for a list of alternatives, values of a certain adaptation type (e.g., remove temporal layers). | dia:UF DataType | 'adpo' box |
| (3) | Utility | 0 . . . N | Each instance of Utility element describes, for a list of alternatives, values in a certain quality/utility type (e.g., MOS). | dia:UF DataType | 'util' box |
|  | UtilityRank | 0 . . . 1 | Describes the quality ranking for a list of alternatives. | dia:UtilityRank Type | 'utir' box |
|  | Value | 1 . . . N | Indicates the quality/utility rank of an alternative. The number of instances of Value element is equal to the number of alternatives. | integer | unsigned int(16) |

The following Table 4 shows common semantics of (1) Resource, (2) AdaptationOperator, and (3) Utility of Table 3.

TABLE 4

| Element (1), (2), (3) | Name | Occurrence | Semantics | XML syntax (based on MPEG-21) | Pseudo-code (File format box) |
|---|---|---|---|---|---|
|  |  | 1 | Describes an identifier for a certain type of the element. When the identifier is not semantically defined by the above embodiment, next three elements are used to find semantics of the identifier in a classification scheme. | Att. 'iOPinRef', ref. a CS term | unsigned int(32) |
|  | CSref_ind | 0 . . . 1 | Indicates the reference index of a classification scheme in the list provided by ClassSchemeRef element. | Not applicable | unsigned int(16) |
|  | LevelNum | 0 . . . 1 | Indicates the number of levels. | Not applicable | unsigned int(16) |
|  | LevelIndex | 1 . . . N | Each instance of LevelIndex element represents an index value at a level of the classification scheme. | Not applicable | unsigned int(16) |
|  | Value | 1 . . . N | Indicates the value of a resource type (adaptation operator, or utility) of an alternative. The number of instances of Value element is equal to the number of alternatives. | a component in dia:VectorDataType | unsigned int(32) |

The following Table 5 shows mapping information.

TABLE 5

|  |  | Occurrence | Semantics | XML syntax (based on MPEG-21) | Pseudo-code (File format box) |
|---|---|---|---|---|---|
| MappingInfo |  | 0 . . . 1 |  | MappingInfoType | 'mapi' box |
|  | AlterLocID | 0 . . . 1 | Provides a location ID for each alternative described in QoSInfo. If AlterLocID element is not present, the first location in the location list may be used for all alternatives. | dia:IntegerVectorType | 'aloc' box |
|  | Value | 1 . . . N | Indicates a location ID for an alternative. The number of instances of this | integer | unsigned int(16) |

TABLE 5-continued

|  |  | Occurrence | Semantics | XML syntax (based on MPEG-21) | Pseudo-code (File format box) |
|---|---|---|---|---|---|
|  |  |  | element is equal to the number of alternatives. The $n^{th}$ instance of Value element corresponds to the $n^{th}$ alternative of QoSInfo description. |  |  |
| ReqQoSPara |  | 0 ... N | Indicates a parameter of QoSInfo that may be put in the request (for an alternative) sent by the client to the server. A parameter may be an instance of Resource, AdaptationOperator, Utility, or Utility Rank elements. | ReqQoS ParaType that extends dia:BooleanVectorType | 'reqp' box |
|  | RefIndex | 1 | Indicates instance index/reference in the instance list of Resource, AdaptationOperator, Utility and Utility Rank elements. | represented by attribute 'iOPinRef' that references an IOPin in QoSInfo | unsigned int(16) |
|  | All | 1 | If true, the parameter needs to be requested for all alternatives and ReqFlag may be skipped. | boolean | flag |
|  | ReqFlag | 0 ... N | Each instance of ReqFlag element corresponds to an alternative. If ReqFlag is true, the request for the corresponding alternative has the parameter identified above. | component of Boolean VectorType | unsigned int(8) |
| LocationList |  | 1 | Provides a list of locations for retrieving content alternatives | LocationListType | 'loci' box |
|  | Location | 1 ... N | Provides information of a location | LocationType | 'loca' box |

Semantics of Location elements may be further provided as shown in Table 6.

TABLE 6

|  |  |  | Occurrence | Semantics | XML syntax (based on DIA) | Pseudo-code (MP4) |
|---|---|---|---|---|---|---|
| Location |  |  | 0 ... N |  | Location-Type | 'loca' box |
|  | LocID |  | 1 | Indicate an ID of an instance of Location element. Location element is referred to by AlterLocID. | integer | unsigned int(16) |
|  | StrLocation |  | 0 ... N | Provides location information of a stream of a content interval. Each stream is provided by either a stream URL or a number of fragment URLs. | StrLocation-Type | 'stlo' box |
|  |  | FragNum | 0 ... 1 | Provides the number of fragments | integer | unsigned int(16) |
|  |  | Stream Url | 0 ... 1 | Describes a URL of a stream | anyURI type | string |
|  |  | Fragment-Url | 0 ... N | Describes a URL of a fragment. The number of instances of FragmentUrl element is the number of fragments. | anyURI type | string |
|  |  | FragTime | 0 ... 1 | Provides durations of fragments. | dia:Vector-DataType | 'frtm' box |
|  |  | Value | 1 ... N | Indicates a duration of a fragment. The number of instances of Value element is the number of fragments. | integer | unsigned int(32) |
|  |  | RandAccess | 0 ... 1 | Describes fragments that support random access. | dia:Vector-DataType | 'rdac' box |
|  |  | Value | 1 ... N | Indicates the order of a random-access fragment. | integer | unsigned int(16) |

TABLE 6-continued

| | | | Occurrence | Semantics | XML syntax (based on DIA) | Pseudo-code (MP4) |
|---|---|---|---|---|---|---|
| | MP2TS Para | | 0 ... 1 | Describes additional parameters (beside URL) for locating a content/program in a MPEG-2 TS. | MP2TS ParaType | 'mp2p' box |
| | | PID | 0 ... N | Describes values of PIDs of content/program in a MPEG-2 TS. | integer | unsigned int(16) |
| | FragBoundaries | | 0 ... 1 | Describes boundaries of (virtual) fragments in a stream. The number of instances of FragBoundaries element is equal to the number of fragments of the stream. Only one type of following elements is present in a FragBoundaries instance. | FragBoundaries Type | 'frbd' box |
| | | MP2TS Boundary | 0 ... N | Describes parameters for detecting (virtual) fragment boundary in a MPEG-2 TS. If there are two instances of MP2TSBoundary element, the two instances are starting and ending boundaries of a fragment. If there is only one instance of MP2TSBoundary element, the instance is the starting boundary. The ending boundary is right before the starting boundary of the next fragment. | MP2TS Boundary-Type | 'mp2b' box |
| | | ISOFile Boundary | 1 ... 2 | Describes parameters for detecting (virtual) fragment boundary in a file based on ISO base media file format. If there are two instances of ISOFileBoundary element, the two instances are starting and ending boundaries of a fragment. If there is only one instance of ISOFileBoundary element, the instance is the starting boundary. The ending boundary is right before the starting boundary of the next fragment. | ISOFile Boundary-Type | 'isfb' box |
| | | ByteRanges | 1 | Describes byte ranges that identify a part/fragment of a file. Parameters provided by ByteRanges element may be used for byte range options in an HTTP request. | ByteRanges-Type | 'brag' box |

Semantics of MP2TSBoundary, ISOFileBoundary, and ByteRanges may be further provided as shown in Table 7.

TABLE 7

| | | Occurrence | Semantics | XML syntax (based on DIA) | Pseudo-code (MP4) |
|---|---|---|---|---|---|
| MP2TSBoundary | | | | MP2TSBoundary-Type | 'mp2b' box |
| | PCR_PID | 1 | Describes PID carrying PCR of the concerned content/program. | integer | unsigned int(16) |
| | PCR_base | 1 | Describes a value of a PCR base field | long | unsigned int(40) |
| | PCR_ext | 1 | Describes a value of a PCR extension field. | integer | unsigned int(16) |

TABLE 7-continued

| | | Occurrence | Semantics | XML syntax (based on DIA) | Pseudo-code (MP4) |
|---|---|---|---|---|---|
| | Appearance | 1 | Describes the appearance order (e.g., $1^{st}$, $2^{nd}$) of the TS packet containing the PCR value identified by the above two elements. If there is resetting/discontinuity of PCR, a PCR value may appear more than once during an interval. | integer | unsigned int(16) |
| | Media_PID | 1 . . . N | Describes PID of a media (e.g., video) of a program. The number of instances of Media_PID element is equal to the number of media of the program/content. | integer | unsigned int(16) |
| | Media_Offset | 1 . . . N | Describes the offset (in TS packets of the same media PID) from the above identified PCR packet to the first media packet of a fragment. The $n^{th}$ instance of Media_Offset is associated with the $n^{th}$ instance of Media_PID. | integer | unsigned int(16) |
| ISOFileBoundary | | | | ISOFileBoundary-Type | 'isfb' box |
| | SequenceNo | 1 | Describes the sequence number provided in the mfhd box. The mfhd box defines a fragment of an MP4 file. SequenceNo with a value of 0 indicates the beginning of the file. | integer | unsigned int(16) |
| ByteRanges | | | | ByteRanges-Type | 'brag' box |
| | Start | 1 . . . N | Describes the starting value of a byte range. A value of '−1' means that this value in the HTTP request is missing. | integer | unsigned int(32) |
| | End | 1 . . . N | Describes the ending value of a byte range. A value of '−1' means that this value in the HTTP request is missing. Start-End instances are present in pair. The $n^{th}$ instance of End is associated with the $n^{th}$ instance of Start. | integer | unsigned int(32) |
| | Media_PID | 0 . . . N | Describes PID of a media (e.g., video) that needs to be extracted from the byte range of the above pair of Start-End. Media_PID element is used when the byte range is a segment of MPEG-2 TS, and all PIDs do not need to be delivered. | integer | unsigned int(16) |

Hereinafter, a client request will be described.

Signaling of metadata obtained by a client may include different parts or levels of signaling information. Accordingly, a request from the client to a server may include parameters of different levels of details.

Main parameters of the client may be URIs, and may be associated with a query part.

Three main scenarios are examined as follows:

1) Server-based scenario

In the server-based scenario, the metadata provided from the server to the client may include general content information 310 and general interval information 320.

For an URI of requested content, DefaultContentIntLoc (if not, DefaultContentIntLoc) may be used. To enable the client to request a specific fragment of content, the following parameters a) and b) are defined in the query part (of the request in operation 140):

a) "fragno": Order value of the fragment in the interval b) "fragti": Start time of the fragment in the interval For example, a request URI may be "HTTP://server.com/file.mp4?fragno=5."

2) Distributed scenario

In the distributed scenario, the metadata provided from the server to the client may include general content information 310, general interval information 320, and QoS information 330.

In addition to the above parameters, the following QoS-related parameters a) through c) are defined in the query part (of the request in operation 140) to enable the client to request an appropriate alternative:

a) "alter": Order value of an alternative. Based on the order value of the alternative, the alternative may appear in the QoS information.

b) "oper1", "oper2", . . . , and "operN":"operi" carries a value of an $i^{th}$ adaptation operation that appears in the QoS information.

c) "res1", "res2", . . . , "resN":"resi" carries a value of an i$^{th}$ resource that appears in the QoS information.

Only one of the above three options may be used in a single request.

With typical adaptation operators and resource types, specific parameter names for better intelligibility and interoperability may be defined.

Adaptation operators are as the following a) through e).

a) audiolayers: indicates the number of scalable audio layers to be discarded.

b) temporallayers: indicates the number of temporal layers of scalable video to be discarded.

c) spatiallayers: indicates the number of spatial layers of scalable video to be discarded.

d) qualitylayers: indicates the number of quality layers of scalable video to be discarded.

e) prioritylayers: indicates the number of priority layers of scalable video to be discarded.

Resource types are as the following a) through d).

a) bitrate: indicates the average bitrate (in Kbps) of the requested alternative.

b) vertresolution: indicates the vertical resolution of the requested alternative.

c) horiresolution: indicates the horizontal resolution of the requested alternative.

d) framerate: indicates the framerate of the requested alternative.

Using the pre-defined parameters, an example of a request URI based on the bitrate may be "http://server.com/file.mp4?fragno=5&bitrate=550."

3) Client-based scenario

In the client-based scenario, the metadata provided from the server to the client may include general content, general interval information, QoS information, and mapping information.

The QoS-related parameters used in the request may be indicated by a ReqQoSPara part of QoSInfo metadata. For example, when RefIndex of ReqQoSPara is 0 or null, the "alter" parameter may be used instead of other options.

When ReqQoSPara is not present in the QoSInfo metadata, the QoS-related parameters may not be used. Alternatives in this case may be implied by locations of MappingInfo.

A URI of content may be derived from rich description of MappingInfo. When content/program is conveyed in an MPEG-2 TS, one or more PIDs may be used to locate the content in the stream.

When additional information for detecting fragment boundaries are provided, the following parameters 1) through 3) for the query part (of the request in operation 140) may be used.

1) For an MPEG-2 TS boundary, Appearance, PCR_PID, PCR_base, PCR_ext, Media_PID, and Media_Offset 2) For an ISO media file boundary, SequenceNo 3) For a file considered as a raw byte-sequence, Start and End Semantics of the above parameters may be provided in semantics of a FragBoundaries element.

Start-End pairs may be used by a range header of an HTTP request message. For example, if {(Start=0, End=99); (Start=200, End=299)}, the header may be "Range: bytes=0-99,200-299."

Hereinafter, syntax representation in an XML format will be described. Representations of the above syntax elements may be provided in the XML format. Semantics of each element may be traced back in the above Tables 1 through 7.

Several elements may be extensions of several types defined in an MPEG-21 DIA. Several few elements may take several types defined in the MPEG-21 DIA.

The following Table 8 shows syntax representation of HTTPStreamingType in the XML format.

TABLE 8

```
<complexType name="HTTPStreamingType">
  <complexContent>
    <extension base="dia:DIADescriptionType">
      <sequence>
        <element name="GeneralInfo" type="GeneralInfoType"
        minOccurs="0"/>
        <choice minOccurs="0" maxOccurs="unbounded">
          <element name="IntervalsRef" type="IntervalsRefType"/>
          <element name="Interval" type="IntervalType"/>
        </choice>
      </sequence> </complexContent>
</complexType>
```

The following Table 9 shows syntax representation of GeneralInfoType in the XML format.

TABLE 9

```
<complexType name="GeneralInfoType">
 <complexContent>
   <extension base="dia:DIADescriptionType">
     <sequence>
       <element name="TimeScale" type="integer" minOccurs="0"/>
       <element name="LiveStartTime" type="dateTime" minOccurs="0"/>
       <element name="Duration" type="integer" minOccurs="0"/>
       <element name="DefaultIntDuration" type="integer"
       minOccurs="0"/>
       <element name="MinUpdateTime" type="integer" minOccurs="0"/>
       <element name="ConsistentQoSInfo" type="boolean"
       minOccurs="0"/>
       <element name="DefaultContentLoc" type="anyURI"
       minOccurs="0"/>
     </sequence>
   </extension>
 </complexContent>
</complexType>
```

The following Table 10 shows syntax representation of IntervalRefType in the XML format.

TABLE 10

```
<complexType name="IntervalsRefType">
 <complexContent>
   <extension base="dia:ReferenceType">
     <sequence>
       <element name="AvaliableTime" type="integer" minOccurs="0"/>
     </sequence>
     <attribute name="startTime" type="xs:duration" use="optional"/>
   </extension>
 </complexContent>
</complexType>
```

The following Table 11 shows syntax representation of IntervalType in the XML format.

TABLE 11

```
<complexType name="IntervalType">
 <complexContent>
   <extension base="dia:DIADescriptionType">
     <sequence>
       <element name="IntervalInfo" type="IntervalInfoType"
       minOccurs="0"/>
       <choice minOccurs="0">
         <element name="QoSInfo" type="QoSInfoType"/>
         <element name="QoSInfoRef" type="dia:ReferenceType"/>
```

TABLE 11-continued

```
    </choice>
    <choice minOccurs="0">
      <element name="MappingInfo" type="MappingInfoType"/>
      <element name="MappingInfoRef" type="dia:ReferenceType"/>
    </choice>
    <element    name="PreviousIntervalsRef"    type=
"IntervalsRefType" minOccurs="0"/>
    <element    name="NextIntervalsRef"    type="IntervalsRefType"
minOccurs="0"/>
    </sequence>
  </extension>
 </complexContent>
</complexType>
```

The following Table 12 shows syntax representation of IntervalInfoType in the XML format.

TABLE 12

```
<complexType name="IntervalInfoType">
  <sequence>
    <element name="TimeScale" type="integer" minOccurs="0"/>
    <element name="StartTime" type="dateTime" minOccurs="0"/>
    <element name="Duration" type="integer" minOccurs="0"/>
    <element name="DefaultFragDuration" type="integer"
     minOccurs="0"/>
    <element name="DefaultContentIntLoc" type="anyURI"
     minOccurs="0"/>
    <element name="Last" type="boolean" minOccurs="0"/>
  </sequence>
</complexType>
```

The following Table 13 shows syntax representations of ISOFileBoundaryType and ByteRangesType in the XML format.

TABLE 13

```
<complexType name="ISOFileBoundaryType">
  <sequence>
    <element name="SequenceNo" type="integer" maxOccurs=
     "unbounded"/>
  </sequence>
</complexType>
<complexType name="ByteRangesType">
  <sequence maxOccurs="unbounded">
    <element name="Start" type="integer"/>
    <element name="End" type="integer"/>
    <element name="Media_PID" type="integer" minOccurs="0"/>
  </sequence>
</complexType>
```

Hereinafter, syntax representation in an MP4 pseudo-code format will be described. Representation of the above syntax elements may be provided in the MP4 pseudo-code format.

The following Table 14 shows syntax representation of HTTPStreamingBox in the MP4 pseudo-code format.

TABLE 14

```
HTTPStreamingBox
  Box Type: 'htps'
  Container: Signaling file
  Mandatory: Yes
  Quantity: One
    Aligned(8) class HTTPStreamingBox extends Box('htps') {
    }
```

Figure 4:
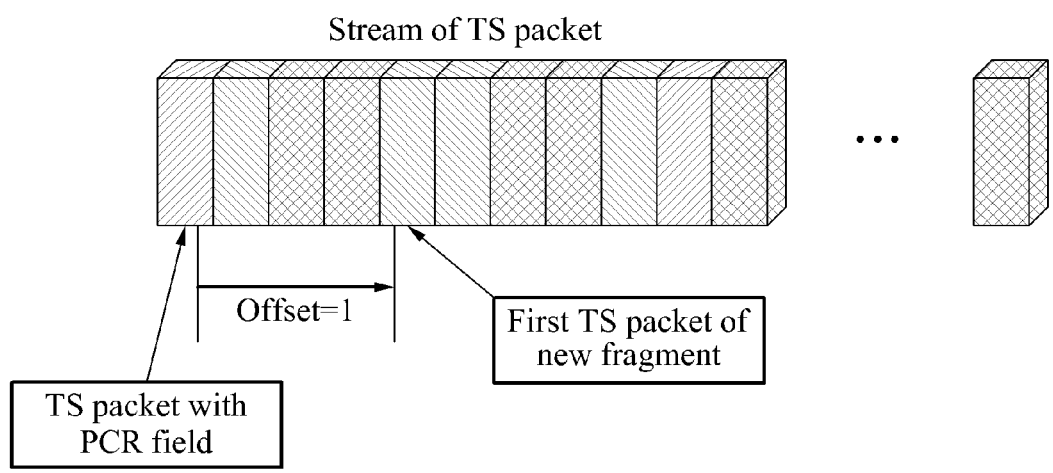
FIG. 4 is a diagram illustrating detection of virtual boundaries in a Moving Picture Experts Group-2 Transport Stream (MPEG-2 TS) according to an embodiment of the present invention.

FIG. 4 is a diagram illustrating detecting of virtual boundaries in an MPEG-2 TS according to an embodiment of the present invention.

In a TS, PCR packets of a given program may be carried with fixed PIDs (namely, PCR_PID), and may be inserted at least every 100 ms.

The PCT packets (with increasing values) may be considered as anchor points of the program. On the other hand, each media of a program may be carried by packets of a given PID (namely, Media_PID).

Accordingly, a fragment boundary of a media stream may be defined or identified by 1) a specific anchor point and 2) an offset from the anchor to the packet at the boundary.

The offset may be counted by the packets of the same Media_PID.

PCR values may be occasionally reset (discontinuity). For example, when one or more PCR packets have the same PCR value in an interval, an appearance order of PCR packets used as anchors may be indicated.

A sourceURL attribute may be changed from required to optional. This is because baseURL already provides a complete URL. The sourceURL may be unnecessary.

The use of multiple byte ranges may provide flexibility in downloading "virtual segments." For example, a segment of a low frame rate (that is able to be used in a trickmode) may be extracted on-the-fly from a stream or an original segment.

In addition, to support using multiple URLs for a Representation, the following modifications may be applied to the schema of 3GPP Adaptive HTTP Streaming.

Hereinafter, multiple locations for the same resource/content will be described.

Each level of description (a top-level, a Period level, and a Representation level) may provide only a single BaseURL for building absolute URLs from the description.

Multiple BaseURLs may be provided at each description level. Multiple BaseURLs may signal availability of resources at multiple locations.

Depending on an actual location of a client, the client may select one or more BaseURLs in a process of retrieving resources.

Such a modification may be implemented by different ways. One way may be to use an additional attribute called "morebaseURLs," or an element called "BaseURLs."

The attribute or element may be a string formed of multiple (base) URLs. The string may be separated by several special characters, for example ";" (namely, a semicolon and a space).

For example, when a semicolon or space appears within a URL, the semicolon or space may be encoded by the rules of RFC 2616.

The morebaseURLs attribute (or BaseURLs element) of a lower description level may override the same attribute (or element) of the higher description level.

For clarity, the morebaseURLs attribute and BaseURLs element may be restricted to be mutually exclusive. In other words, only a single type may exist in a whole description.

Another way may be to use a MoreBaseURL element of any URI type with multiple instances, where each instance provides a BaseURL.

The different ways may be merely examples of ideas for providing multiple BaseURLs. The ideas may be implemented in many other ways or even other languages.

Hereinafter, multiple locations for resource/content components will be described.

Resource/content may be divided into one or more components/streams. Each of the one or more components/streams may be delivered from a location. The delivering may be supported by allowing multiple instances of an UrlTemplate element or a Url element set in SegmentInfoType. A modification "<xs:choice maxOccurs="unbounded">" in SegmentInfoType may be used for the above purpose.

The appearance order of an UrlTemplate instance or a Url set instance may indicate importance of "location/stream." A more important location may appear before a less important location. For example, a video Representation may include two streams (for example, a spatial base layer, and a spatial enhancement layer). Each of the two streams may be delivered from a location described by UrlTemplate. Subsequently, the first instance of UrlTemplate may be a location for the spatial base layer.

Moreover, multiple instances of InitialisationSegmentURL may be allowed. An $n^{th}$ instance of InitialisationSegmentURL may correspond to an $n^{th}$ instance of a location (by either the UrlTemplate element or the Url element set).

For example, when only a single instance of InitialisationSegmentURL exists, the instance may be used for all locations.

The following Tables 15 through 19 show the schema of 3GPP AdaptiveHTTPStreaming.

TABLE 15

```
<?xml version="1.0" encoding="UTF-8"?>
<xs:schema
targetNamespace="urn:3GPP:ns:PSS:AdaptiveHTTPStreamingMPD:2009"
  attributeFormDefault="unqualified"
  elementFormDefault="qualified"
  xmlns:xs="http://www.w3.org/2001/XMLSchema"
  xmlns="urn:3GPP:ns:PSS:AdaptiveHTTPStreamingMPD:2009">
  <xs:annotation>
   <xs:appinfo>Media Presentation Description</xs:appinfo>
   <xs:documentation xml:lang="en">
     This Schema defines 3GPP Media Presentation Description!
   </xs:documentation>
  </xs:annotation>     <!-- MPD: main element -->
  <xs:element name="MPD" type="MPDtype"/>
<!-- MPD Type -->
<xs:complexType name="MPDtype">
  <xs:sequence>
    <xs:element     minOccurs="0"      name="ProgramInformation"
type="ProgramInformationType"/>
    <xs:choice maxOccurs="unbounded">
      <xs:element name="Period" type="PeriodType"/>
      <xs:element name="PeriodsRef" type="PeriodsRefType"/>
    </xs:choice>
    <xs:element minOccurs="0" name="BaseUrls" type="xs:string"/>
    <xs:element  minOccurs="0" maxOccurs="unbounded"
name="MoreBaseUrl" type="xs:anyURI"/>
    <xs:any   namespace="##other"   processContents="lax"
minOccurs= "0" maxOccurs="unbounded"/>
  </xs:sequence>
  <xs:attribute default="OnDemand" name="type"
type="PresentationType"/>
  <xs:attribute name="availabilityStartTime" type="xs:dateTime"/>
  <xs:attribute name="availabilityEndTime" type="xs:dateTime"/>
  <xs:attribute name="mediaPresentationDuration" type="xs:duration"/>
  <xs:attribute name="minimumUpdatePeriodMPD" type="xs:duration"/>
  <xs:attribute name="minBufferTime" type="xs:duration"
use="required"/>
  <xs:attribute name="timeShiftBufferDepth" type="xs:duration"/>
  <xs:attribute name="baseUrl" type="xs:anyURI"/>
  <xs:attribute name="morebaseUrls" type="xs:string"/>
  <xs:anyAttribute namespace="##other" processContents="lax"/>
</xs:complexType>
<xs:complexType name="PeriodsRefType">
  <xs:sequence>
    <xs:element name="Location" type="xs:anyURI"/>
  </xs:sequence>
  <xs:attribute name="startTime" type="xs:duration"/>
  <xs:attribute name="duration" type="xs:duration"/>
  <xs:attribute name="availableTime" type="xs:duration"/>
</xs:complexType>
```

TABLE 16

```
<!-- Type of presentation - live or on-demand -->
<xs:simpleType name="PresentationType">
  <xs:restriction base="xs:string">
    <xs:enumeration value="OnDemand"/>
    <xs:enumeration value="Live"/>
  </xs:restriction>
</xs:simpleType>
<!-- Period of a presentation -->
<xs:complexType name="PeriodType">
  <xs:sequence>
    <xs:element     minOccurs="0"      name="SegmentInfoDefault"
type="SegmentInfoDefaultType"/>
    <xs:element     maxOccurs="unbounded"      name="Representation"
type="RepresentationType"/>
    <xs:element     minOccurs="0"      name="PreviousPeriodsRef"
type="xs:PeriodsRef"/>
    <xs:element minOccurs="0" name="NextPeriodsRef" type=
"xs:PeriodsRef"/>
    <xs:any   namespace="##other"   processContents="lax"
minOccurs= "0" maxOccurs="unbounded"/>
  </xs:sequence>
  <xs:attribute name="start" type="xs:duration"/>
  <xs:attribute default="false" name="segmentAlignmentFlag"
type="xs:boolean"/>
  <xs:attribute default="false" name="bitStreamSwitchingFlag"
type= "xs:boolean"/>
  <xs:attribute default="false" name="lastPeriodFlag" type="xs:boolean"/>
  <xs:anyAttribute namespace="##other" processContents="lax"/>
</xs:complexType>
<!-- Program information for a presentation -->
<xs:complexType name="ProgramInformationType">
  <xs:sequence>
    <xs:element    minOccurs="0" name="Title" type="xs:string"/>
    <xs:element    minOccurs="0" name="Source" type="xs:string"/>
    <xs:element    minOccurs="0" name="Copyright" type="xs:string"/>
    <xs:any   namespace="##other"   processContents="lax"
minOccurs= "0" maxOccurs="unbounded"/>
  </xs:sequence>
  <xs:attribute name="moreInformationURL" type="xs:anyURI"/>
  <xs:anyAttribute namespace="##other" processContents="lax"/>
</xs:complexType>
```

TABLE 17

```
<!-- Default Segment access information -->
<xs:complexType name="SegmentInfoDefaultType">
  <xs:sequence>
    <xs:element minOccurs="0" name="BaseUrls" type="xs:string"/>
    <xs:element minOccurs="0" maxOccurs="unbounded"
name="MoreBaseUrl" type="xs:anyURI"/>
    <xs:any   namespace="##other"   processContents="lax"
minOccurs="0" maxOccurs="unbounded"/>
  </xs:sequence>
  <xs:attribute name="baseURL" type="xs:anyURI"/>
  <xs:attribute name="morebaseUrls" type="xs:string"/>
  <xs:attribute name="duration" type="xs:duration"/>
  <xs:attribute name="sourceUrlTemplatePeriod" type="xs:string"/>
  <xs:anyAttribute namespace="##other" processContents="lax"/>
</xs:complexType>
<!-- A Representation of the presentation content for a specific Period -->
<xs:complexType name="RepresentationType">
  <xs:sequence>
    <xs:element name="SegmentInfo" type="SegmentInfoType"/>
    <xs:element      minOccurs="0"         name="ContentProtection"
type="ContentProtectionType"/>
    <xs:element minOccurs="0" name="TrickMode" type=
"TrickModeType"/>
    <xs:element  minOccurs="0"  maxOccurs="unbounded"  name=
"Quality" type="QualityType"/>
    <xs:any   namespace="##other"   processContents="lax"
minOccurs="0" maxOccurs="unbounded"/>
  </xs:sequence>
  <xs:attribute name="bandwidth" type="xs:unsignedInt" use="required"/>
  <xs:attribute default="0" name="group" type="xs:unsignedInt"/>
  <xs:attribute name="width" type="xs:unsignedInt"/>
  <xs:attribute name="height" type="xs:unsignedInt"/>
  <xs:attribute name="lang" type="xs:string"/>
```

TABLE 17-continued

```
  <xs:attribute name="mimeType" type="xs:string" use="required"/>
  <xs:attribute default="false" name="startWithRAP" type="xs:boolean"/>
  <xs:attribute name="qualityRanking" type="xs:unsignedInt"/>
  <xs:attribute name="requestPara" type="xs:string"/>
  <xs:anyAttribute namespace="##other" processContents="lax"/>
</xs:complexType>
<xs:complexType name="QualityType">
  <xs:sequence>
    <xs:any   namespace="##other"   processContents="lax"
minOccurs="0" maxOccurs="unbounded"/>
  </xs:sequence>
  <xs:attribute name="name" type="xs:QualityNameType"/>
  <xs:attribute name="value" type="xs:float"/>
</xs:complexType>
```

TABLE 18

```
<xs:simpleType name="QualityNameType">
  <xs:restriction base="xs:string">
    <xs:enumeration value="PSNR"/>
    <xs:enumeration value="MOS"/>
    <xs:enumeration value="ODG"/>
    <xs:enumeration value="DI"/>
  </xs:restriction>
</xs:simpleType>
<!-- Segment access information -->
<xs:complexType name="SegmentInfoType">
  <xs:sequence>
    <xs:element minOccurs="0" name="BaseUrls" type="xs:string"/>
    <xs:element minOccurs="0" maxOccurs="unbounded"
name="MoreBaseUrl" type="xs:anyURI"/>
<xs:element      minOccurs="0"      maxOccurs="unbounded"
name="InitialisationSegmentURL" type="UrlType"/>
    <xs:choice maxOccurs="unbounded">
      <xs:element minOccurs="0" name="UrlTemplate" type=
"UrlTemplateType"/>
      <xs:sequence>
        <xs:element maxOccurs="unbounded" name="Url" type=
"UrlType"/>
        <xs:any   namespace="##other"   processContents="lax"
minOccurs="0" maxOccurs="unbounded"/>
      </xs:sequence>
      <xs:any   namespace="##other"   processContents="lax"
minOccurs="0" maxOccurs="unbounded"/>
    </xs:choice>
  </xs:sequence>
  <xs:attribute name="baseURL" type="xs:anyURI"/>
  <xs:attribute name="morebaseUrls" type="xs:string"/>
  <xs:attribute name="duration" type="xs:duration"/>
  <xs:attribute name="randAccess" type="xs:string"/>
  <xs:anyAttribute namespace="##other" processContents="lax"/>
</xs:complexType>
<!-- A Segment URL -->
<xs:complexType name="UrlType">
  <xs:sequence>
    <xs:any   namespace="##other"   processContents="lax"
minOccurs="0" maxOccurs="unbounded"/>
  </xs:sequence>
  <xs:attribute name="sourceURL" type="xs:anyURI" use="optional"/>
  <xs:attribute name="range" type="xs:string"/>
  <xs:anyAttribute namespace="##other" processContents="lax"/>
</xs:complexType>
```

TABLE 19

```
<!-- A URL template -->
<xs:complexType name="UrlTemplateType">
<xs:sequence>
  <xs:any   namespace="##other"   processContents="lax"
minOccurs="0" maxOccurs="unbounded"/>
</xs:sequence>
<xs:attribute name="sourceURL" type="xs:anyURI"/>
<xs:attribute name="id" type="xs:string"/>
<xs:attribute default="1" name="startIndex" type="xs:unsignedInt"/>
<xs:attribute name="endIndex" type="xs:unsignedInt"/>
```

TABLE 19-continued

```
  <xs:anyAttribute namespace="##other" processContents="lax"/>
</xs:complexType>
<!-- Gives information about the content protection -->
<xs:complexType name="ContentProtectionType">
  <xs:sequence>
    <xs:element minOccurs="0" name="SchemeInformation"
type="xs:string"/>
    <xs:any    namespace="##other"    processContents="lax"
minOccurs="0" maxOccurs="unbounded"/>
  </xs:sequence>
  <xs:attribute name="schemeIdUri" type="xs:anyURI"/>
  <xs:anyAttribute namespace="##other" processContents="lax"/>
</xs:complexType>
<!-- Gives information about trick mode -->
<xs:complexType name="TrickModeType">
  <xs:sequence>
    <xs:any    namespace="##other"    processContents="lax"
minOccurs="0" maxOccurs="unbounded"/>
  </xs:sequence>
  <xs:attribute name="alternatePlayoutRate" type="xs:string"/>
  <xs:anyAttribute namespace="##other" processContents="lax"/>
</xs:complexType>
</xs:schema>
```

Figure 5:
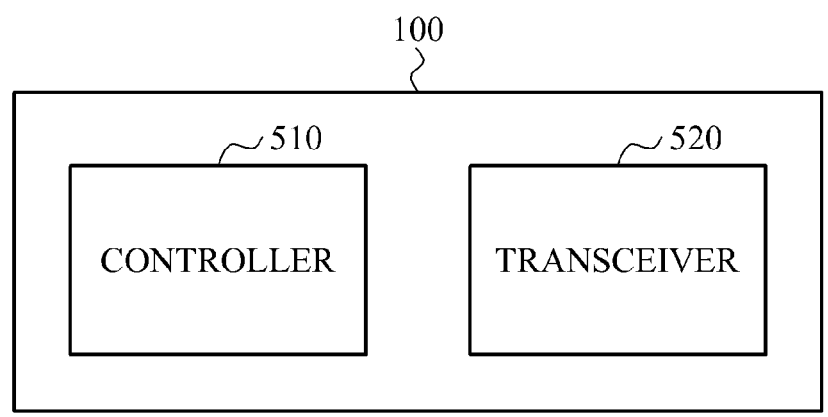
FIG. 5 is a diagram illustrating a configuration of a terminal 100 according to an embodiment of the present invention.

FIG. 5 is a diagram illustrating a configuration of the terminal 100 according to an embodiment of the present invention.

A controller 510 may perform operations 130 and 140. Specifically, the controller 510 may process the metadata of the interval.

A transceiver 520 that selects a fragment suitable for the interval based on the processing may perform operations 120, 140, and 150. Specifically, the transceiver 520 may receive the metadata of the interval of the content from the server 110, may send a request for the fragment suitable for the interval to the server, and may receive the fragment from the server.

Figure 6:
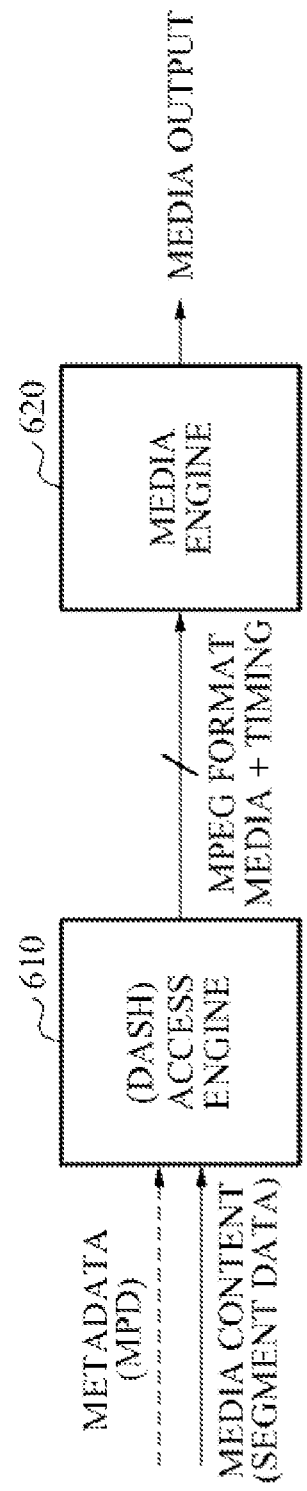
FIG. 6 is a diagram illustrating a configuration of a terminal 100 according to an embodiment of the present invention.

FIG. 6 is a diagram illustrating a configuration of the terminal 100 according to an embodiment of the present invention.

The terminal 100 may include an access engine 610, and a media engine 620.

The access engine 610 may be a DASH access engine.

The access engine 610 may receive metadata (for example, an MPD) from the server 110.

The access engine 610 may form requests, and may issue the formed requests to the server 110. The access engine 610 may receive media (for example, segments or parts of the segments) from the server 110. The access engine may request a segment of the media using a URL of the segment.

The access engine 610 may receive segments of the media based on information provided by the metadata. Here, each period may include one or more groups, and each of the groups may include one or more representations of the media. Each of the representations may include one or more segments.

The access engine 610 may provide the media to the media engine 620. The access engine 610 may decode data of the media included in the segments.

An output of the access engine 610 may include media (or a part of the media) of an MPEG container (for example, an ISO/IEC 14492-12 ISO base media file format, or an ISO/IEC 13818-2 MPEG-2 TS). Additionally, the output of the access engine 610 may include timing information used to map internal timing of the media to a timeline of a media presentation.

The media engine 620 may play back the provided media. Specifically, the media engine 620 may receive data of the media from the access engine, and may output the media. The media engine 620 may output the media using the data of the media and the timing information that are output from the access engine 610.

Technical information according to the embodiments of the present invention described above with reference to FIGS. 1 through 5 may equally be applied to the present embodiment. Accordingly, further description thereof will be omitted.

The method according to the above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be to of the kind well-known and available to those having skill in the computer software arts. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for providing media, the method comprising:
receiving metadata of media, the metadata comprising one or more BaseURL elements;
sending a request for a segment of the media using a Uniform Resource Locator (URL) of the segment, the URL being resolved with respect to a BaseURL element;
receiving the segment; and
decoding and rendering data of the media that is included in the segment,
wherein identical segments are accessible at multiple locations indicated by URLs resolved with respect to the respective BaseURL elements,
wherein the metadata is a Media Presentation Description (MPD) of the media
wherein the media comprises a sequence of one or more periods,
wherein a BaseURL element comprises one or more MPD level BaseURL elements of the MPD, and one or more period level BaseURL elements of the periods, and
wherein a URL of a segment included in each of the periods is resolved with respect to a period level BaseURL element.

2. A method for providing media, the method comprising:
receiving metadata of media, the metadata comprising one or more BaseURL elements;
sending a request for a segment of the media using a Uniform Resource Locator (URL) of the segment, the URL being resolved with respect to a BaseURL element;
receiving the segment; and
decoding and rendering data of the media that is included in the segment,
wherein a first BaseURL element among the BaseURL elements is used as a basic Universal Resource Indicator (URI), and BaseURL elements other than the first BaseURL element are used as alternative BaseURL elements,
wherein the metadata is a Media Presentation Description (MPD) of the media
wherein the media comprises a sequence of one or more periods,
wherein a BaseURL element comprises one or more MPD level BaseURL elements of the MPD, and one or more period level BaseURL elements of the periods, and
wherein a URL of a segment included in each of the periods is resolved with respect to a period level BaseURL element.

3. A terminal, comprising:
an access engine to receive metadata of media, to send a request for a segment of the media using a Uniform Resource Locator (URL) of the segment, to receive the segment, and to decode data of the media that is included in the segment, the metadata comprising one or more BaseURL elements, and the URL being resolved with respect to a BaseURL element; and
a media engine to receive the data of the media from the access engine, and to output the media,
wherein identical segments are accessible at multiple locations indicated by URLs resolved with respect to the respective BaseURL elements,
wherein the metadata is a Media Presentation Description (MPD) of the media
wherein the media comprises a sequence of one or more periods,
wherein a BaseURL element comprises one or more MPD level BaseURL elements of the MPD, and one or more period level BaseURL elements of the periods, and
wherein a URL of a segment included in each of the periods is resolved with respect to a period level BaseURL element.

4. A terminal, comprising:
an access engine to receive metadata of media, to send a request for a segment of the media using a Uniform Resource Locator (URL) of the segment, to receive the segment, and to decode data of the media that is included in the segment, the metadata comprising one or more BaseURL elements, and the URL being resolved with respect to a BaseURL element; and
a media engine to receive the data of the media from the access engine, and to output the media,
wherein a first BaseURL element among the BaseURL elements is used as a basic Universal Resource Indicator (URI), and BaseURL elements other than the first BaseURL element are used as alternative BaseURL elements,
wherein the metadata is a Media Presentation Description (MPD) of the media
wherein the media comprises a sequence of one or more periods,
wherein a BaseURL element comprises one or more MPD level BaseURL elements of the MPD, and one or more period level BaseURL elements of the periods, and
wherein a URL of a segment included in each of the periods is resolved with respect to a period level BaseURL element.

* * * * *